(12) United States Patent
Taylor et al.

(10) Patent No.: US 8,581,161 B2
(45) Date of Patent: Nov. 12, 2013

(54) SEEKER WITH A MOLDED DICHROIC MIRROR

(75) Inventors: Byron B. Taylor, Tucson, AZ (US); W. Howard Poisl, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 297 days.

(21) Appl. No.: 12/896,273

(22) Filed: Oct. 1, 2010

(65) Prior Publication Data

US 2012/0080552 A1   Apr. 5, 2012

(51) Int. Cl.
  *F41G 7/20*   (2006.01)
  *F41G 7/00*   (2006.01)

(52) U.S. Cl.
  USPC ......... 244/3.19; 244/3.1; 244/3.15; 244/3.16; 342/52; 342/53; 342/61; 342/62

(58) Field of Classification Search
  USPC ............ 89/1.11; 244/3.1–3.3; 342/61, 62, 52, 342/53; 343/700 R, 720, 721, 725, 772, 343/781 R, 781 CA; 525/50, 461, 462, 466; 356/3, 4.01; 359/350, 361, 483.01, 359/487.01, 487.02, 489.01, 489.15, 601, 359/602, 603, 604, 608, 618, 629, 634, 638
  See application file for complete search history.

(56) References Cited

U.S. PATENT DOCUMENTS

| | | | |
|---|---|---|---|
| 3,114,149 A * | 12/1963 | Jessen, Jr. ................. | 343/720 |
| 3,130,308 A * | 4/1964 | Astheimer ................. | 244/3.16 |
| 3,165,749 A * | 1/1965 | Cushner ................... | 244/3.19 |
| 3,701,158 A * | 10/1972 | Johnson .................... | 343/725 |
| 3,897,294 A | 7/1975 | MacTurk | |
| 4,070,573 A | 1/1978 | Allen et al. | |
| 4,264,907 A * | 4/1981 | Durand et al. ............. | 342/53 |
| 4,324,491 A * | 4/1982 | Hueber .................... | 244/3.16 |
| 4,326,799 A * | 4/1982 | Keene et al. .............. | 244/3.16 |
| 4,477,814 A * | 10/1984 | Brumbaugh et al. ........ | 343/725 |
| 4,576,346 A * | 3/1986 | Gauggel et al. ........... | 244/3.16 |
| 4,652,885 A * | 3/1987 | Saffold et al. ............. | 343/725 |
| 4,698,638 A * | 10/1987 | Branigan et al. ........... | 343/725 |
| 4,755,868 A * | 7/1988 | Hodges .................... | 348/780 |
| 4,756,611 A * | 7/1988 | Yonekubo et al. .......... | 359/370 |
| 4,913,528 A * | 4/1990 | Hasegawa ................. | 359/638 |
| 5,161,051 A * | 11/1992 | Whitney et al. ........... | 244/3.16 |
| 5,182,564 A * | 1/1993 | Burkett et al. ............. | 342/53 |
| 5,307,077 A * | 4/1994 | Branigan et al. ........... | 343/720 |
| 5,327,149 A * | 7/1994 | Kuffer ..................... | 343/720 |
| 5,724,187 A * | 3/1998 | Varaprasad et al. ........ | 359/608 |
| 5,944,281 A * | 8/1999 | Pittman et al. ............. | 244/3.12 |
| 6,021,975 A * | 2/2000 | Livingston ................ | 244/3.11 |
| 6,060,703 A * | 5/2000 | Andressen ................ | 343/725 |
| 6,080,455 A | 6/2000 | Purinton et al. | |
| 6,111,697 A * | 8/2000 | Merrill et al. ............. | 359/487.02 |
| 6,145,784 A * | 11/2000 | Livingston ................ | 244/3.11 |
| 6,150,974 A * | 11/2000 | Tasaka et al. .............. | 342/53 |
| 6,250,583 B1 * | 6/2001 | Livingston ................ | 244/3.13 |

(Continued)

FOREIGN PATENT DOCUMENTS

GB       2100403 A      12/1982

*Primary Examiner* — Bernarr Gregory
(74) *Attorney, Agent, or Firm* — Lando & Anastasi, LLP

(57) ABSTRACT

A molded dichroic mirror and a seeker comprising a molded dichroic mirror are provided. The dichroic mirror may be molded from polysiloxane or lithia potash borosilicate and may be coated to reflect an infrared signal and configured to transmit a radio frequency signal between 33 GHz and 37 GHz.

11 Claims, 2 Drawing Sheets

(56) References Cited

U.S. PATENT DOCUMENTS

| | | | |
|---|---|---|---|
| 6,252,559 B1 * | 6/2001 | Donn | 343/781 CA |
| 6,262,850 B1 * | 7/2001 | Krisko et al. | 359/634 |
| 6,268,822 B1 * | 7/2001 | Sanders et al. | 342/62 |
| 6,292,302 B1 * | 9/2001 | Krisko et al. | 359/634 |
| 6,307,676 B1 * | 10/2001 | Merrill et al. | 359/487.02 |
| 6,343,766 B1 * | 2/2002 | Livingston | 244/3.13 |
| 6,449,093 B2 * | 9/2002 | Hebrink et al. | 359/489.15 |
| 6,574,045 B2 * | 6/2003 | Hebrink et al. | 359/361 |
| 6,606,066 B1 * | 8/2003 | Fawcett et al. | 343/725 |
| 6,924,772 B2 * | 8/2005 | Kiernan et al. | 343/725 |
| 7,183,966 B1 * | 2/2007 | Schramek et al. | 244/3.1 |
| 7,781,540 B2 * | 8/2010 | Yanagida et al. | 525/466 |
| 7,786,418 B2 * | 8/2010 | Taylor et al. | 244/3.16 |
| 7,952,688 B2 * | 5/2011 | Paiva et al. | 356/4.01 |
| 2007/0126652 A1 | 6/2007 | Wolfenden et al. | |
| 2009/0225640 A1 | 9/2009 | Manabe et al. | |
| 2010/0127113 A1 | 5/2010 | Taylor et al. | |

\* cited by examiner

SEEKER WITH A MOLDED DICHROIC MIRROR

TECHNICAL FIELD

The present invention generally relates to a seeker and more particularly to a seeker including a molded dichroic mirror.

BACKGROUND

Missiles, rockets and other projectiles often use a seeker. A seeker is part of guidance system and is typically mounted at the front of the missile or other projectile. A seeker typically uses a series of mirrors to split and direct radio frequency signals, infrared signals and/or other types of signals to respective receivers and often has a dome to protect the equipment. The radio frequency signals and infrared signals may be used, for example, for imaging and targeting. The signals used by the seeker are first transmitted through the dome before being split and directed to their respective receivers by the mirrors. The missile, rocket or other projectiles may have a processor to interpret the received radio frequency signal and infrared signal to track a target and to guide the projectile to the target.

The mirrors used in seekers and similar devices are generally very precise so that the missile or other projectile can accurately track an identified target. One of the mirrors, sometimes called a dichroic mirror or secondary mirror, is typically ground from fused silica. The grinding processes can be an expensive and labor intensive, thereby increasing the overall manufacturing cost of the seeker.

Accordingly, it is desirable to have a seeker with a precision made, low cost dichroic mirror. Other desirable features and characteristics will become apparent from the subsequent detailed description and the appended claims, taken in conjunction with the accompanying drawings and this background.

BRIEF SUMMARY

A precision made, low cost dichroic mirror may be manufactured by molding particular materials. The material preferably has certain characteristics, such as a low dielectric constant and a low softening temperature. The material is preferably selected to be able to reflect certain frequencies while allowing other frequencies to pass, or be transmitted.

A seeker is provided. The seeker may include a first receiver configured to receive an infrared signal, a second receiver configured to receive a radio frequency signal and a dichroic mirror configured to reflect the infrared signal to the first receiver and to transmit the radio frequency signal to the second receiver, wherein the dichroic mirror is molded.

Another seeker is provided. The seeker may include an infrared receiver configured to receive an infrared signal and a millimeter-wave transceiver configured to receive a millimeter-wave signal. The seeker may further include a primary mirror configured to reflect the infrared signal and the millimeter wave signal and a molded dichroic mirror configured to transmit the reflected millimeter-wave signal to the millimeter-wave transceiver and to further reflect the infrared signal to the infrared receiver.

A dichroic mirror is further provided. The dichroic mirror may be molded from a material selected from a group consisting of a polymer resin and a moldable oxide glass.

BRIEF DESCRIPTION OF THE DRAWINGS

The present invention will hereinafter be described in conjunction with the following figures.

DETAILED DESCRIPTION OF THE DRAWINGS

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
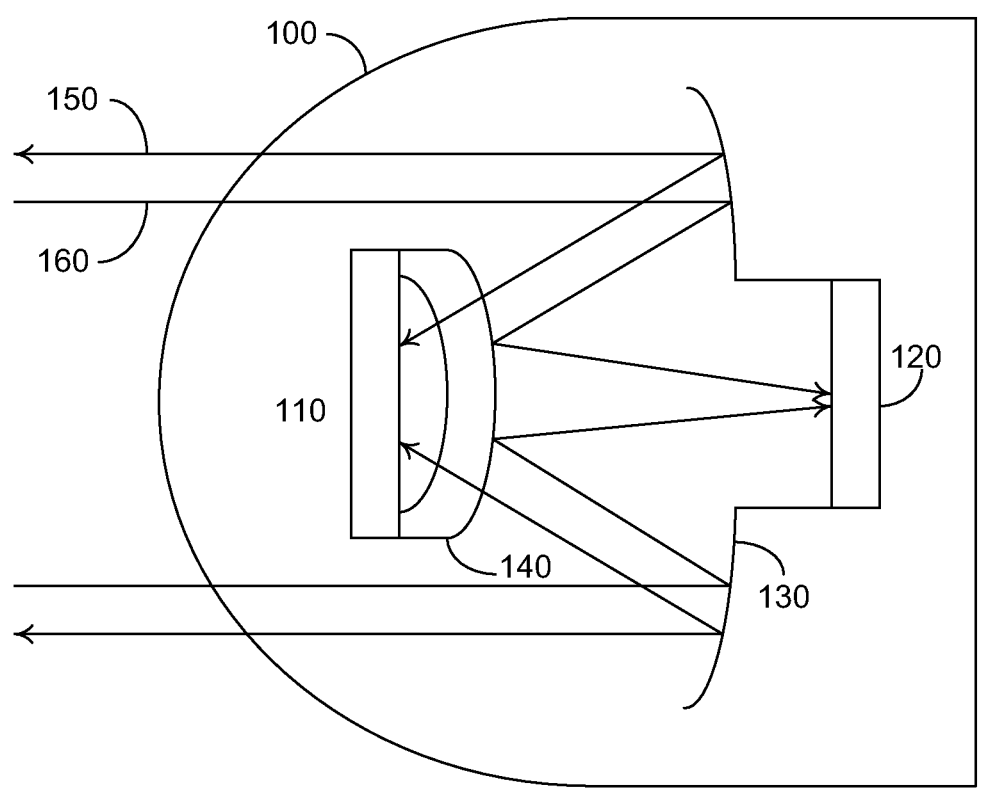
FIG. 1 illustrates an exemplary seeker in accordance with an embodiment.

FIG. 1 illustrates an exemplary seeker 100 that includes a millimeter-wave ("MMW") transceiver 110, an infrared ("IR") receiver 120, a primary mirror 130 and a molded dichroic mirror 140. The primary mirror 130 is configured to reflect a MMW signal 150, which is an RF signal, and an IR signal 160 to the molded dichroic mirror 140 and may be substantially parabolic in shape. The shape and composition of the primary mirror can be selected to accurately reflect the MMW signal 150 and the IR signal 160 received by the seeker to the molded dichroic mirror 140.

The molded dichroic mirror 140 is configured to reflect the IR signal 160 to the IR receiver 120 and is further configured to transmit (i.e., allow to pass) the MMW signal 150 to the MMW transceiver 110. The composition and shape of the molded dichroic mirror 140 can be selected to focus and transmit the MMW signal 150 to the MMW transceiver 110 while reflecting and focusing the IR signal 160 to the IR receiver 120.

The MMW transceiver may be configured to receive the MMW signal 150 which may be used, for example, for target tracking in both clear and adverse weather conditions. The MMW transceiver may also be configured to transmit a MMW signal 150.

The IR receiver 120 is configured to receive the IR signal 160, which may be used, for example, to provide high resolution images for target classification and for track and aim point enhancements.

The exemplary seeker 100 shown in FIG. 1 may be an element of a missile or rocket guidance system and may have 2 modes of operation; millimeter-wave radar and infrared imaging. In another embodiment, the seeker 100 may have a third mode using a semiactive laser system to allow third party target designation, or any number of other enhancements.

The millimeter wave radar operates through any weather condition, and is used in weapons to give them "fire and forget" capability. The imaging infrared system may be an uncooled longwave imaging infrared (LWIR) system, which uses high-resolution thermal scans to a similar end, and is better against some kinds of targets with heat signatures higher then their surroundings. By combining these MMW radar system and the imaging infrared systems, countermeasures, such as decoys, are less effective against the missiles.

Other types of seekers previously included a ground and polished fused silica dichroic mirror. One benefit, for example, of switching to molding the dichroic mirror 140 is a significant reduction in cost, an important factor when the seeker 100 is mass produced. However, it was discovered that fused silica was unsuitable for molding because of its high softening temperature. Furthermore, if modifiers were added to the fused silica to reduce the softening temperature, the dielectric constant of the modified fused silica became too high.

The base composition of the molded dichroic mirror 140 preferably has a softening temperature less than 600° C., which is a maximum softening temperature in current standard molding equipment so that the molded part will not distort during the molding process. Furthermore, the dielectric constant ∈' of the dichroic mirror is preferably less than 4. A dichroic mirror with a dielectric constant ∈' under 4 can be made thicker, and more mechanically robust, while still allowing the MMW signal 150 to be transmitted through the dichroic mirror 140.

The dielectric constant ∈' of the molded dichroic mirror 140 is a function of composition of the glass used to mold the dichroic mirror 140 and the frequency of the MMW signal transmitting through the molded dichroic mirror 140. As discussed above, materials, such as metallic oxides, can be added to a glass to reduce the softening temperature of the composition, however, the added materials tend to increase the dielectric constant ∈'. Furthermore, material added to the composition can increase the cost of the dichroic mirror and adds steps to the molding process.

As discussed above, a low dielectric constant ∈' is preferred since it allows the dichroic mirror to be made thicker, and more mechanically robust. A molded dichroic mirror with a low dielectric constant may also have less boresight error, error due to linear displacement between incoming MMW signals 150.

One of the difficulties in selecting a material for the molded dichroic mirror 140 is that the dielectric constant ∈' of each material varies depending upon the frequency of the signal transmitting or passing through the material. Accordingly, each material had to be tested at various frequencies to determine corresponding dielectric constants.

Another difficulty in selecting a material for the molded dichroic mirror 140 is that the wavelengths of the MMW signal 150 and the infrared signal 160 are several orders of magnitude apart. The seeker 100 may use, for example, a MMW signal in the Ka band, which may operate between 26.5 and 40 GHz. In contrast, the infrared signal 160 used by the seeker 100 may operates in the terahertz range. As discussed above, the molded dichroic mirror 140, for the purposes of the seeker 100, is designed to reflect the infrared signal 160 while allowing the MMW signal 150 to transmit through the molded dichroic mirror to be received by MMW transceiver 110.

Another difficulty in selecting a material for the molded dichroic mirror 140 is that the material preferably has a low loss tangent, preferably 0.01 or less. A lower the loss tangent equates to less of the MMW signal being absorbed when transmitting through the molded dichroic mirror 140.

Yet another difficulty in selecting a material for the molded dichroic mirror 140 is that the material must be able to be coated with a dielectric stack for infrared reflection. There are many ways that the coating may be applied, including, but not limited to, thermal evaporation and sputtering.

After an extensive search, two materials were found to be suitable for the molded dichroic mirror 140. The first suitable material is lithia potash borosilicate. Lithia potash borosilicate is typically used in microscope slides. Lithia potash borosilicate has a softening temperature of around 500° C. and a dielectric constant of around 4. However, lithia potash borosilicate is not designed to be molded. As lithia potash borosilicate is heated the glass phase separates and becomes milky and translucent, and thus is an undesirable material, when molded, for optical applications. However, the phase separation had no influence on the dielectric constant or the mechanical properties of the glass at MMW frequencies.

The second suitable material is polysiloxane, which is a plastic or polymer resin. Polysiloxane is typically used in armor and thermal protection systems. Polysiloxane does not transmit visible or infrared wavelengths, and thus is not used in optical systems. However, polysiloxane has a dielectric constant ∈' of around 3.36-3.41 at MMW frequencies and has a low molding temperature.

Neither the lithia potash borosilicate nor the polysiloxane are typically used in precision optical components.

Both lithia potash borosilicate and polysiloxane have low dielectrics when the MMW frequency was between 33 GHz and 37 GHz. However, both materials were still viable candidates at frequencies outside of that range. Furthermore, both lithia potash borosilicate and polysiloxane had processing temperatures low enough to be molded in current standard molding equipment. Furthermore, both materials are suitable candidates to be coated with the dielectric stack.

One benefit of the embodiments, for example, is that the cost to produce the molded dichroic mirrors is significantly less than the cost to grind and polish a mirror. Furthermore, because the lithia potash borosilicate and polysiloxane were discovered to have a low dielectric constant at the preferred operating frequencies of 33 GHz to 37 GHz and were capable of being coated with the dielectric stack, the performance of the molded dichroic mirrors equaled that of the ground and polished mirrors.

Figure 2:
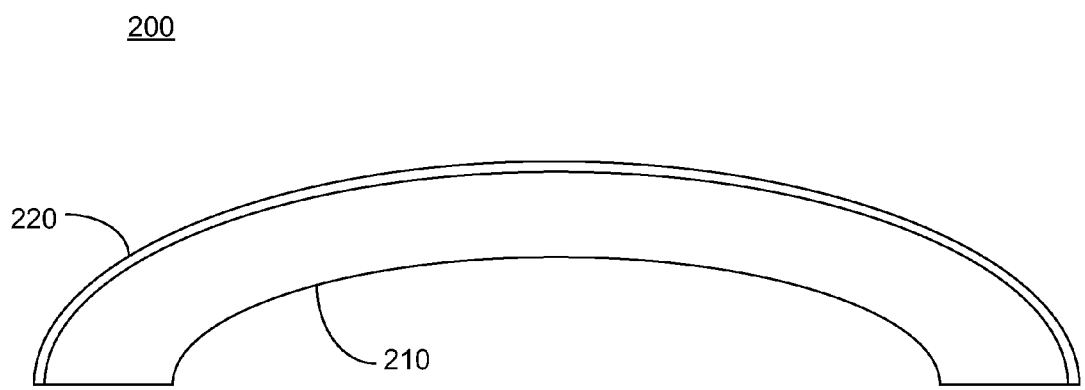
FIG. 2 illustrates an exemplary dichroic mirror in accordance with an embodiment.

FIG. 2 illustrates an exemplary dichroic mirror 200 in accordance with an embodiment. The dichroic mirror 200 includes a base mirror 210, which may be molded from lithia potash borosilicate and polysiloxane. As discussed above, the material of the base mirror 210 is selected to transmit a MMW signal to a MMW transceiver. The shape of the base mirror 210 can be designed to focus the MMW signal to the MMW transceiver while reflecting and focusing the IR signal, reflected by dielectric stack 220, to towards the IR receiver. The rear of the dichroic mirror 200 could also be shaped for directing the MMW energy into a preferred pattern.

While the dielectric stack is illustrated in FIG. 2 to cover a single side of the base mirror 210, the dielectric stack 220 may be deposited on all sides of the base mirror 210 or only on selected portions of the first and/or opposite side of the base mirror 210.

While the molded dichroic mirror described herein is described with reference to a seeker, the molded dichroic mirror may be used in other applications. Polysiloxane could be used for a structural primary mirror 130 illustrated in FIG. 1 or other light weighted optics.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiments in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A seeker, comprising:
    a first receiver configured to receive an infrared signal;
    a second receiver configured to receive a radio frequency signal;
    a dichroic mirror configured to reflect the infrared signal toward the first receiver and to transmit the radio frequency signal toward the second receiver, wherein the dichroic mirror includes a material that transmits the radio frequency signal and reflects the infrared signal, the material having a softening temperature of less than or equal to 600° C. and a dielectric constant of less than or equal to 4, and wherein the dichroic mirror is made by molding the material to form the dichroic mirror.

2. The seeker of claim 1, wherein the material of the dichroic mirror has a loss tangent less than or equal to 0.01 at MMW frequencies.

3. The seeker of claim 1, wherein the material is polysiloxane.

4. The seeker of claim 1, wherein the material is lithia potash borosilicate.

5. The seeker of claim 1, wherein the dichroic mirror includes a dielectric stack configured to reflect the infrared signal.

6. The seeker of claim 1, wherein the radio frequency signal is between 33 GHz and 37 GHz.

7. A seeker, comprising:
   an infrared receiver configured to receive an infrared signal;
   a millimeter-wave transceiver configured to transmit and receive a millimeter-wave signal;
   a primary mirror configured to reflect the infrared signal and the millimeter wave signal; and
   a molded dichroic mirror configured to transmit the reflected millimeter-wave signal toward the millimeter-wave transceiver and to further reflect the infrared signal toward the infrared receiver, the molded dichroic mirror having a softening temperature of less than or equal to 600° C., and a dielectric constant of less than or equal to 4 at millimeter-wave frequencies.

8. The seeker of claim 7, wherein the molded dichroic mirror has a loss tangent less than or equal to 0.01.

9. The seeker of claim 7, wherein the molded dichroic comprises polysiloxane.

10. The seeker of claim 7, wherein the molded dichroic mirror comprises lithia potash borosilicate.

11. The seeker of claim 7, wherein the molded dichroic mirror is configured to transmit a radio frequency signal between 33 GHz and 37 GHz.

* * * * *